F. H. FRISSELL.
ELASTIC CORD.
APPLICATION FILED SEPT. 27, 1912.

1,050,442.

Patented Jan. 14, 1913.

Witnesses
C. L. Weed
M. P. Nichols.

Frank H. Frissell
Inventor
by Symons & Earle
Attys

UNITED STATES PATENT OFFICE.

FRANK H. FRISSELL, OF MIDDLETOWN, CONNECTICUT, ASSIGNOR TO THE RUSSELL MFG. CO., OF MIDDLETOWN, CONNECTICUT, A CORPORATION.

ELASTIC CORD.

1,050,442. Specification of Letters Patent. Patented Jan. 14, 1913.

Application filed September 27, 1912. Serial No. 722,566.

*To all whom it may concern:*

Be it known that I, FRANK H. FRISSELL, a citizen of the United States, residing at Middletown, in the county of Middlesex and State of Connecticut, have invented a new and useful Improvement in Elastic Cords; and I do hereby declare the following, when taken in connection with the accompanying drawings and the characters of reference marked thereon, to be a full, clear, and exact description of the same, and which said drawings constitute part of this application, and represent, in—

Figure 1:
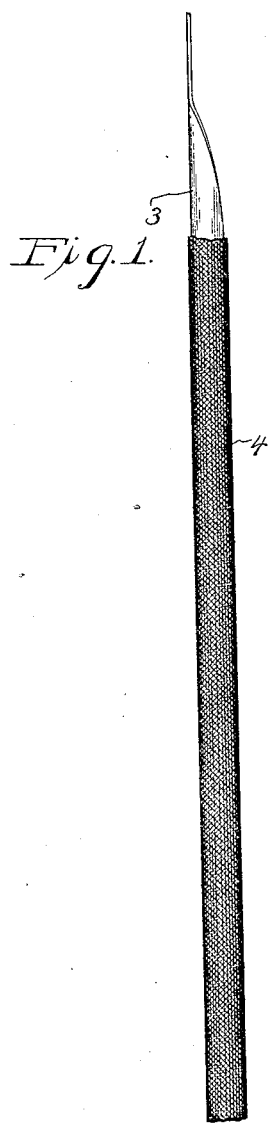
Figure 2:
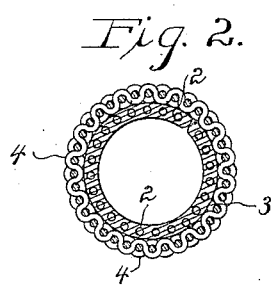

Figure 1 a view in side elevation of a portion of my improved elastic cord. Fig. 2 a view in cross-section on an enlarged scale.

My invention relates to an improved elastic cord, the object being to produce, at a low cost for manufacture, elastic cord constructed with particular reference to being sewed in place with a minimum of injury, and to the protection of its rubber strands from the air so as to secure the maximum "life" for the cord.

With these ends in view, my invention resides in an elastic cord consisting of a tubular core of woven, narrow elastic fabric and a braided cover therefor.

In carrying out my invention as herein shown, I take what is commonly known to the trade as "narrow elastic fabric" which consists of strands 2 of rubber embedded in a woven cover 3 which incloses the respective strands of rubber so as to individually protect them from the air and so as to prevent them from "creeping" unduly in case they are severed. This narrow elastic fabric which is woven flat, is formed into a tube and covered in an ordinary braiding machine with a braided cover 4. The article thus produced has the outward appearance of round elastic cord such as is to be found on the market, but is different therefrom in so far as the elastic strands 2 instead of being arranged in direct contact with each other in a bundle or cable within the braided cover 4, are individually embedded and isolated in a woven fabric 3 in which they are protected from the air, whereby their "life" is prolonged, and in which they are so bound that if severed the severed ends will not unduly "creep." Furthermore my improved elastic cord combines bulkiness with lightness, it being desirable in most uses of elastic cords to unite these two qualities. On account of the embedding of the rubber strands 2 in a woven fabric 3, my improved elastic cord may be fastened in place by stitching with the minimum impairment of it, since if the needle does pierce some of the rubber strands, the same are so bound and held by the woven fabric 3, in which they are embedded, that the "creeping" of the severed ends amounts to so little as not to appreciably impair the elastic qualities of the cord.

I claim:—

As a new article of manufacture, an elastic cord consisting of a tubular core of woven, narrow elastic fabric, and a braided cover therefor.

In testimony whereof, I have signed this specification in the presence of two subscribing witnesses.

FRANK H. FRISSELL.

Witnesses:
RICHARD C. FAGAN,
HENRY W. HUBBARD.

Copies of this patent may be obtained for five cents each, by addressing the "Commissioner of Patents, Washington, D. C."